D. Z. LANTZ.
Horse Hay-Rakes.
No. 133,944.  Patented Dec. 17, 1872.
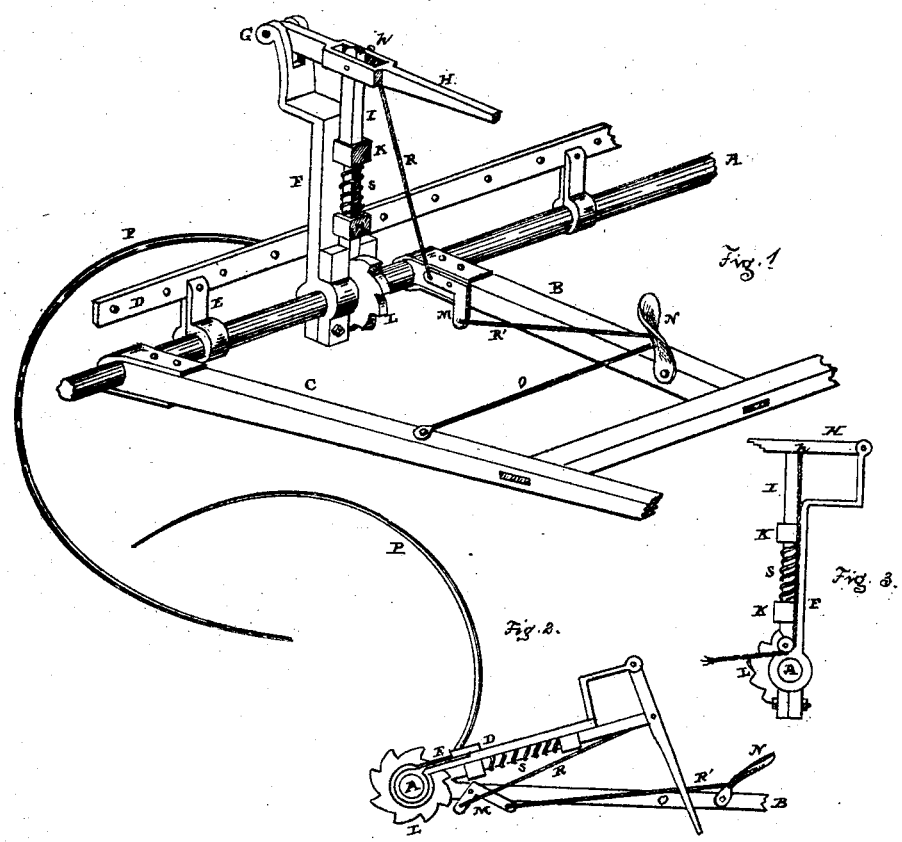

UNITED STATES PATENT OFFICE.

DAVID Z. LANTZ, OF SALISBURY TOWNSHIP, LANCASTER COUNTY, PA.

IMPROVEMENT IN HORSE HAY-RAKES.

Specification forming part of Letters Patent No. 133,944, dated December 17, 1872.

*To all whom it may concern:*

Be it known that I, DAVID Z. LANTZ, of Salisbury township, (near the Gap post-office,) in the county of Lancaster and State of Pennsylvania, have invented certain Improvements in Horse Hay-Rakes, of which the following is a specification:

My invention relates to the manner of operating a horse-rake for dislodging the gathered hay by means of a foot-lever connected with a spring-bolt and ratchet, and made self-acting by means of a lever and tripper to restore the rake in position for raking or again gathering.

The drawing shows my device in combination with an ordinary horse-rake, shown in part.

Figure 1 is a perspective view, when in position for raking; Fig. 2, a side view when the rake-teeth are raised.

This rake is mounted on two wheels in the ordinary manner, having rounded or revolving axles A, which are provided on each side with a ratchet and pawl in common use. The shafts C, timber B, and rake-supports E are made to embrace the axle by means of rounded loops, in which the axle revolves freely. The rake-bar D, on its supports E, and to which the heel of the teeth P is attached, is also centrally connected to the spring-bolt and lever-support F. This latter is slotted below, allowing space for a ratchet, L, and so formed with a short piece on each leg as to embrace the axle of the machine and form a pair of boxes or bearings. The ratchet L is keyed to the axle, and necessarily revolves with it. The support F is bent at right angles outward and upward at top, and slotted to receive the bolt-lever and tripper H, by a pivot-pin, G, as also to the sliding bolt I, guided and held by the keepers K K, and held up by the coiled spring S so as to be directly over the ratchet L. This lever-arm H is slightly wedge-shaped, and extended so as to strike a tripper, O, when depressed. There is an eye, *h*, on the pivot-pin that holds the bolt I. This is connected with an elbowed lever, M, held by a pivot on a timber, B, the other end of the lever M being connected with the foot-lever N.

In Fig. 3 I show a modification, by attaching a flanged pulley on the lower end of the support F and making a chain connection from the pin *h*, carried down and under the pulley forward to the foot-lever N, as preferable to and doing away with the elbowed lever M.

The operation is easily comprehended. Whenever it is desirable to raise the teeth from the ground, for discharging the gathered hay or otherwise, it is only necessary for the driver seated on the rake to depress the foot-lever N, which, by its connection with the bolt and lever H I, depresses the bolt and yielding-spring so as to bring the end of the bolt squarely down upon the ratchet, a tooth of which comes in contact so as to lock the same, carrying the support F and connected tooth-bar D with it, which raises the teeth, as shown by Fig. 2. In the meantime the extended arm of the lever H has come in contact with the tripper O, and withdrawn the bolt from the ratchet-teeth, permitting the rake-axle to revolve freely. It is only necessary to release the foot-lever, when the weight of the rake-teeth will restore them to the ground in position to perform their functions.

I do not deem it necessary to show the rake, wheels, seat, &c., as such are no part of my invention. The novelty consists in the arrangement and operation of my spring-bolt and rake attachment. Therefore,

What I claim as my improvement on horse hay-rakes is—

The arrangement and combination of the spring-bolt S I, keepers K, support F, connected with the tooth-bar D and axle A, ratchet L, lever H, foot-lever N, and tripper O, all substantially in the manner and for the purpose specified.

DAVID Z. LANTZ.

Witnesses:
FRANK M. TROUT,
JOS. C. WALKER.